United States Patent
Kim

(10) Patent No.: US 9,464,954 B2
(45) Date of Patent: *Oct. 11, 2016

(54) TORQUE SENSOR

(71) Applicant: LG Innotek Co., Ltd., Seoul (KR)

(72) Inventor: Sungmin Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,244

(22) Filed: Dec. 30, 2015

(65) Prior Publication Data

US 2016/0109308 A1    Apr. 21, 2016

Related U.S. Application Data

(63) Continuation of application No. 14/107,330, filed on Dec. 16, 2013, now Pat. No. 9,255,854.

(30) Foreign Application Priority Data

Dec. 17, 2012    (KR) .................. 10-2012-0147301

(51) Int. Cl.
| | |
|---|---|
| *G01L 3/00* | (2006.01) |
| *G01L 3/10* | (2006.01) |
| *F16B 21/16* | (2006.01) |
| *G01L 3/02* | (2006.01) |
| *B62D 6/10* | (2006.01) |
| *G01L 5/22* | (2006.01) |

(52) U.S. Cl.
CPC ............. *G01L 3/104* (2013.01); *F16B 21/16* (2013.01); *G01L 3/02* (2013.01); *G01L 3/10* (2013.01); *G01L 3/101* (2013.01); *B62D 6/10* (2013.01); *G01L 5/221* (2013.01)

(58) Field of Classification Search
CPC ......... G01L 3/10; G01L 3/104; G01L 3/101; G01L 5/221; G01D 5/00; B62D 6/10
USPC ...................... 73/862.325, 862.331–862.335
See application file for complete search history.

(56) References Cited

U.S. PATENT DOCUMENTS

| | | | |
|---|---|---|---|
| 6,367,337 | B1 | 4/2002 | Schlabach |
| 7,021,160 | B2 | 4/2006 | Pattok et al. |
| 7,174,795 | B2 | 2/2007 | Feng et al. |
| 8,375,810 | B2 | 2/2013 | Bae et al. |

(Continued)

FOREIGN PATENT DOCUMENTS

| | | |
|---|---|---|
| KR | 10-2009-0002885 A | 1/2009 |
| KR | 10-2009-0128859 A | 12/2009 |

OTHER PUBLICATIONS

U.S. Office Action issued in parent U.S. Appl. No. 14/107,330 dated Jane 18, 2015.

*Primary Examiner* — Lisa Caputo
*Assistant Examiner* — Jonathan Dunlap
(74) *Attorney, Agent, or Firm* — Ked & Associates LLP

(57) ABSTRACT

Provided is a torque sensor. The torque sensor comprises a rotor section; and a stator section comprising a stator holder, wherein the stator holder comprises a plurality of coupling pieces protruding in an axial direction, and a hog ring coupled to pass through the plurality of coupling pieces, wherein the plurality of coupling pieces have through-holes formed in a circumferential direction and an inner wall of the through-hole is adhered to the hog ring.

10 Claims, 2 Drawing Sheets

(56) References Cited

U.S. PATENT DOCUMENTS

| | | |
|---|---|---|
| 8,561,481 B2 | 10/2013 | Bae et al. |
| 2004/0250631 A1 | 12/2004 | Pattok et al. |
| 2005/0172732 A1 | 8/2005 | Feng et al. |
| 2010/0319466 A1 | 12/2010 | Bae et al. |
| 2011/0005340 A1 | 1/2011 | Jeon et al. |
| 2013/0125668 A1 | 5/2013 | Bae et al. |
| 2014/0013863 A1 | 1/2014 | Bae et al. |
| 2014/0326077 A1 | 11/2014 | Yoneda et al. |

TORQUE SENSOR

CROSS-REFERENCE TO RELATED APPLICATIONS

This application is a Continuation Application of prior U.S. patent application Ser. No. 14/107,330 filed Dec. 16, 2013, which claims priority under 35 U.S.C. §119 to Korean Application No. 10-2012-0147301 filed on Dec. 17, 2012, whose entire disclosures are hereby incorporated by reference.

BACKGROUND

1. Field

The present application relates to a sensor, and more particularly, to a torque sensor.

2. Background

A power steering system for a vehicle is a system configured to smoothly manipulate a steering handle when a frictional resistance applied to a steering wheel is increased and thus a manipulation force for steering a steering handle is also increased.

While a hydraulic power steering system using a hydraulic pressure is used in the related art, in recent times, a motor-operated power steering system using a rotational force of a motor is widely used.

The motor-operated power steering system requires a torque sensor as disclosed in Korean Patent Laid-Open Publication No. 10-2009-0002885.

Meanwhile, the torque sensor disclosed in the publication has a structure in which a hog ring is coupled to an outer circumferential surface of a pressing section by an elastic force of the hog ring. Here, while the hog ring is referred to as a pressing ring in Korean Patent Laid-Open Publication No. 10-2009-0002885, the hog ring is used in a torque sensor field while mixed with the pressing ring.

Accordingly, the hog ring is likely to be separated during a process of inserting the hog ring in to the pressing section. In addition, an assembly process of inserting the hog ring into the pressing section is needed to increase manufacturing cost.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
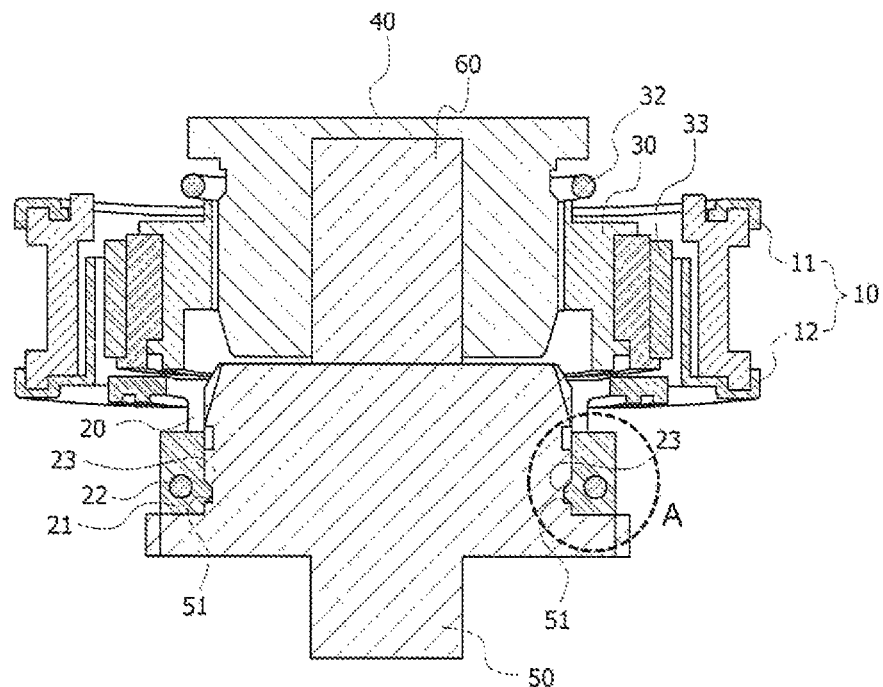
FIG. 1 is a longitudinal cross-sectional view schematically showing a torque sensor according to an embodiment of the present application.

Exemplary embodiments of the present application will be described in detail below with reference to the accompanying drawings. While the present application is shown and described in connection with exemplary embodiments thereof, it will be apparent to those skilled in the art that various modifications can be made without departing from the spirit and scope of the application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present application. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In this specification, a singular form includes a plural form unless the context specifically mentions. When an element is referred to as "comprises" and/or "comprising", it does not preclude another component, step, operation and/or device, but may further include the other component, step, operation and/or device unless the context clearly indicates otherwise. A commercial implementation in accordance with the spirit and teachings of the present application may configured according to the needs of the particular application, whereby any aspect(s), feature(s), function(s), result(s), component(s), approach(es), or step(s) of the teachings related to any described embodiment of the present application may be suitably omitted, included, adapted, mixed and matched, or improved and/or optimized by those skilled in the art, using their average skills and known techniques, to achieve the desired implementation that addresses the needs of the particular application.

Unless otherwise defined, all terms including technical and scientific terms used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an embodiment will be described with reference to the accompanying drawings in detail, the same or corresponding elements are designated by the same reference numerals, and overlapping description thereof will be omitted.

Figure 2:
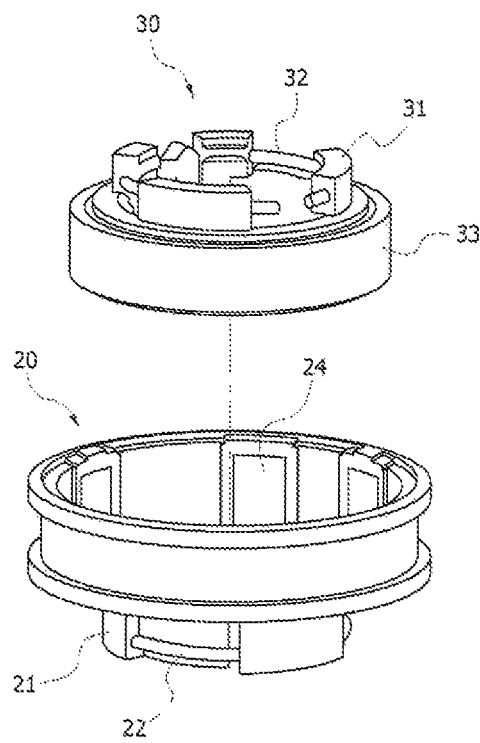
FIG. 2 is a perspective view schematically showing a stator holder and a rotor holder according to the embodiment of the present application.

FIG. 1 is a longitudinal cross-sectional view schematically showing a torque sensor according to an embodiment of the present application, and FIG. 2 is a perspective view schematically showing a stator holder and a rotor holder according to the embodiment of the present application.

Referring to FIGS. 1 and 2, the torque sensor according to the embodiment of the present application includes a rotor section into which a first steering shaft is inserted and a stator section into which a second steering shaft is inserted.

The rotor section includes a cylindrical rotor holder 30 connected to a steering input shaft (a first shaft), and a rotor magnet 33 attached to an outer circumferential surface of the rotor.

The stator section includes a first stator ring 11 and a second stator ring 12, which are opposite to each other and disposed to be spaced apart from each other and a stator holder 20 connected to an output shaft (a second shaft).

In addition, a magnetic sensor (not shown) configured to detect a magnetic variation generated as the rotor section and the stator section are rotated is further provided. An input shaft 40 and an output shaft 50 are coupled by a torsion bar 60 having torsional elasticity.

Meanwhile, hereinafter, a function of the torque sensor configured to detect a torque using a magnetic sensor disclosed in Korean Patent Laid-Open Publication No. 10-2011-0038280 or the like is well known, and thus, description thereof will be omitted.

The stator holder 20 is formed in a cylindrical shape, in which the first stator ring 11 and the second stator ring 12 are accommodated. The first stator ring 11 and the second stator ring 12 include teeth 24 bent in opposite directions. The rotor holder 30 is rotatably accommodated in a central section of the stator holder 20.

The stator holder 20 further includes a second coupling piece 21 configured to press an outer surface of the output shaft 50 to couple the stator holder 20 and the output shaft 50. The second coupling piece 21 includes a second hog ring 22 configured to contract the second coupling piece 21 in a central direction.

The second hog ring 22 may be formed of a material having an elastic force to be implemented as a ring shape with an open portion.

The second coupling piece 21 protrudes in an axial direction to be coupled to the output shaft 50, and is formed in a circumferential direction. In addition, a through-hole (not shown) is formed in the coupling piece 21 in the circumferential direction, and the second hog ring 22 is disposed along the through-hole. Here, an inner wall of the through-hole may be adhered or fused to the second hog ring 22.

For example, the second hog ring 22 may be formed at the second coupling piece 21 through insert molding. Accordingly, an assembly process of the second hog ring 22 is omitted, and separation of the second hog ring 22 in a process of assembling the torque sensor is prevented.

The rotor holder 30 is formed in a cylindrical shape, into which the input shaft (the first shaft) 40 is coupled. A ring-shaped magnet 33 is mounted on an outer circumferential surface of the rotor holder 30.

The rotor holder 30 further includes a first coupling piece 31 configured to press an outer surface of the input shaft 40 to couple the rotor holder 30 and the input shaft 40. The first coupling piece 31 includes a first hog ring 32 configured to contract the first coupling piece 31 in the central direction.

The first hog ring 32 may be formed of a material having an elastic force and implemented in a ring shape with an open portion.

The first coupling piece 31 protrudes in the axial direction to be coupled to the input shaft 40, and is formed in the circumferential direction. In addition, the coupling piece 31 has a through-hole (not shown) formed in the circumferential direction, and the first hog ring 32 is disposed along the through-hole. Here, the inner wall of the through-hole may be adhered to the first hog ring 32.

For example, the first hog ring 32 may be formed at the first coupling piece 31 through insert molding. Accordingly, a process of assembling the first hog ring 32 is omitted, and separation of the first hog ring 32 in a process of assembling the torque sensor is prevented.

Figure 3:
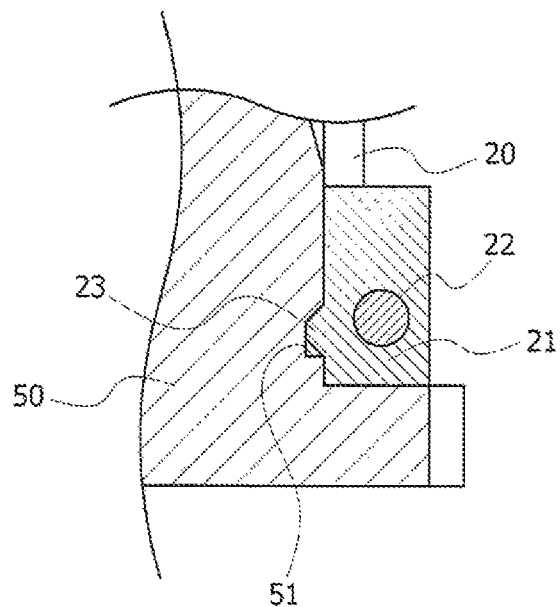
FIG. 3 is an enlarged view of a portion A of FIG. 1.

FIG. 3 is an enlarged view of a portion A of FIG. 1.

Referring to FIG. 3, a coupling protrusion 23 protruding toward a center of the second coupling piece 21 is formed at an inner surface of the second coupling piece 21. In addition, a coupling recess 51 corresponding to a shape of the coupling protrusion 23 is formed at an outer circumferential surface of the output shaft 50. Here, since the second hog ring 22 presses the second coupling piece 21 toward the center thereof, the coupling protrusion 23 and the coupling recess 51 are adhered to limit relative axial movement between the stator holder 20 and the output shaft 50.

As can be seen from the foregoing, according to the embodiment of the present application, probability of separation of the hog ring during a process of manufacturing of the torque sensor is removed, and the number of assembly processes of the torque sensor is reduced to reduce manufacturing cost.

The present application is directed to provide a torque sensor capable of reducing probability of separation of a hog ring, reducing the number of assembly processes to reduce manufacturing cost.

According to an aspect of the present application, there is provided a torque sensor including a stator holder into which an output shaft is inserted and coupled, a second coupling piece connected to the stator holder to come in contact with an outer surface of the output shaft, and a through-hole formed in the second coupling piece in a circumferential direction, wherein a second hog ring is disposed in the through-hole to contract the second coupling piece in a central direction.

According to another aspect of the present application, there is provided a torque sensor including: a rotor holder into which an input shaft is inserted and coupled; a first coupling piece coupled to the rotor holder to come in contact with an outer surface of the input shaft; and a through-hole formed in the first coupling piece in a circumferential direction, and a first hog ring is disposed in the through-hole to contract the first coupling piece in a central direction.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A torque sensor comprising:
    a rotor section; and
    a stator section comprising a stator holder,
    wherein the stator holder comprises a plurality of coupling pieces protruding in an axial direction, and a hog ring coupled to pass through the plurality of coupling pieces, wherein the plurality of coupling pieces have through-holes formed in a circumferential direction and an inner wall of the through-hole is adhered to the hog ring.

2. The torque. sensor according to claim 1, wherein the hog ring has an elastic force.

3. The torque sensor according to claim 1, wherein the plurality of the coupling pieces comprise a coupling protrusion formed on an inner surface thereof, and the coupling protrusion is coupled to a coupling recess formed at an outer surface of a shaft.

4. The torque sensor according to claim 1, wherein the hog ring and the plurality of coupling pieces are formed through insert molding.

5. The torque sensor according to claim 1, wherein the stator holder is configured to fix a first stator ring and a second stator ring.

6. The torque sensor according to claim 1, wherein the rotor section comprises a rotor holder and a ring-shaped magnet mounted on an outer surface of the rotor holder.

7. The torque sensor according to claim 6, wherein the rotor holder comprises a plurality of coupling pieces protruding in an axial direction, and a hog ring configured to pass through the plurality of coupling pieces of the rotor holder.

8. The torque sensor according to claim 7, wherein the plurality of coupling pieces of the rotor holder have through-holes, through which the hog ring of the rotor holder passes, formed in a circumferential direction, and an inner wall of the through-hole of the rotor holder is adhered to the hog ring of the rotor holder.

9. A torque sensor comprising:

a rotor section comprising a rotor holder; and a stator section, wherein the rotor holder comprises a plurality of first coupling pieces protruding in the axial direction, and a first hog ring configured to pass through the plurality of first coupling pieces, wherein the plurality of first coupling pieces have through-holes formed in a circumferential direction, and an inner wall of the through-hole is adhered to the first hog ring.

10. The torque sensor according to claim 9, wherein the rotor section comprises a magnet mounted on an outer circumferential surface of the rotor holder.

* * * * *